US010531372B1

(12) United States Patent
Parshin et al.

(10) Patent No.: US 10,531,372 B1
(45) Date of Patent: Jan. 7, 2020

(54) LOCATION-BASED SERVICE ZONE CLUSTER MANAGEMENT AND MONITORING

(71) Applicant: Amazon Technologies, Inc., Seattle, WA (US)

(72) Inventors: Sergey Parshin, Redcliffe (AU); Ronen Barenboim, Redmond, WA (US); Michael Bowerman, Seattle, WA (US); Jon Robert Ducrou, West End (AU); Ryan Hapgood, Belmont (AU); Qiwei Liu, Santa Clara, CA (US); Michael Schollmeyer, Seattle, WA (US); James Michael Sutula, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/670,441

(22) Filed: Aug. 7, 2017

(51) Int. Cl.
*H04W 48/16* (2009.01)
*H04L 29/08* (2006.01)
*H04W 4/021* (2018.01)
*H04W 88/06* (2009.01)
*H04W 36/00* (2009.01)

(52) U.S. Cl.
CPC ............ *H04W 48/16* (2013.01); *H04L 67/16* (2013.01); *H04W 4/021* (2013.01); *H04W 36/0083* (2013.01); *H04W 88/06* (2013.01)

(58) Field of Classification Search
CPC . H04W 48/16; H04W 4/021; H04W 36/0083; H04W 88/06; H04L 67/16
See application file for complete search history.

(56) References Cited

U.S. PATENT DOCUMENTS

| 7,983,691 | B1 | 7/2011 | Wong et al. |
| 8,838,751 | B1 | 9/2014 | Scofield et al. |
| 9,258,677 | B2 | 2/2016 | Saha et al. |
| 9,503,860 | B1 | 11/2016 | Mankovskii et al. |

(Continued)

FOREIGN PATENT DOCUMENTS

EP         3025527        6/2016

OTHER PUBLICATIONS

PCT Patent Application PCT/US2018/030651 filed on May 2, 2018, International Search Report and Written Opinion dated Jul. 4, 2018.

(Continued)

*Primary Examiner* — Minjung Kim
(74) *Attorney, Agent, or Firm* — Thomas Horstemeyer, LLP (57) ABSTRACT

Disclosed are various embodiments for managing location-based service zones being monitored by a client device. The location-based service zones within a geographic region can be organized in location-based service zone clusters. In response to receiving an active zone from a computing device, a client device can begin monitoring the geographic parameters for the top-level location-based service zone clusters. When the client device detects an entry into a particular location-based service zone cluster, the client device stops monitoring the top-level location-based service zone clusters and begins monitoring the location-based service zones that are within the particular location-based service zone cluster.

20 Claims, 6 Drawing Sheets

(56) References Cited

U.S. PATENT DOCUMENTS

| | | | |
|---|---|---|---|
| 9,648,581 | B1 | 5/2017 | Vaynblat et al. |
| 9,651,673 | B2 | 5/2017 | Lacatus et al. |
| 9,749,206 | B2 | 8/2017 | Jung et al. |
| 9,749,794 | B2 | 8/2017 | Saha et al. |
| 9,948,492 | B2 | 4/2018 | Jung et al. |
| 10,057,412 | B1 | 8/2018 | Salour et al. |
| 10,104,605 | B1 | 10/2018 | Parshin et al. |
| 10,122,682 | B1 | 11/2018 | Salour et al. |
| 10,123,163 | B2 | 11/2018 | Kernan |
| 10,129,694 | B1 | 11/2018 | Parshin et al. |
| 2008/0174485 | A1 | 7/2008 | Carani et al. |
| 2009/0006211 | A1 | 1/2009 | Perry et al. |
| 2009/0268652 | A1 | 10/2009 | Kneckt et al. |
| 2011/0153428 | A1 | 6/2011 | Ramer et al. |
| 2012/0001938 | A1 | 1/2012 | Sandberg |
| 2012/0309413 | A1 | 12/2012 | Grosman et al. |
| 2013/0267253 | A1 | 10/2013 | Case et al. |
| 2013/0304576 | A1 | 11/2013 | Berland et al. |
| 2013/0310053 | A1 | 11/2013 | Srivastava et al. |
| 2014/0045521 | A1 | 2/2014 | Grainger et al. |
| 2014/0058815 | A1 | 2/2014 | Hiremath et al. |
| 2014/0162692 | A1 | 6/2014 | Li et al. |
| 2014/0164118 | A1 | 6/2014 | Polachi |
| 2014/0370909 | A1 | 12/2014 | Natucci et al. |
| 2015/0024773 | A1* | 1/2015 | Li ............... H04W 4/021 455/456.1 |
| 2015/0094097 | A1* | 4/2015 | Fraccaroli ..... H04W 4/021 455/456.3 |
| 2015/0149286 | A1 | 5/2015 | Brown, II |
| 2015/0223022 | A1 | 8/2015 | Kumar et al. |
| 2015/0326624 | A1* | 11/2015 | Rajendran ........ H04L 67/12 709/204 |
| 2015/0341747 | A1 | 11/2015 | Barrand et al. |
| 2016/0094944 | A1* | 3/2016 | Kong ............. H04W 4/022 455/456.1 |
| 2016/0135005 | A1* | 5/2016 | Saha .............. H04W 4/021 455/456.1 |
| 2017/0048666 | A1* | 2/2017 | Choi .............. H04W 4/021 |
| 2017/0078840 | A1 | 3/2017 | Saurav et al. |
| 2017/0300968 | A1 | 10/2017 | Reiver |
| 2017/0372055 | A1 | 12/2017 | Robinson et al. |
| 2018/0020324 | A1 | 1/2018 | Beauford |

OTHER PUBLICATIONS

U.S. Appl. No. 15/601,533, filed May 22, 2017, Non-Final Office Action dated Jul. 17, 2018.

U.S. Appl. No. 15/601,538, filed May 22, 2017, Notice of Allowance dated Mar. 27, 2018.

U.S. Appl. No. 15/601,508, filed May 22, 2017, Response to Non-Final Office Action dated Jan. 25, 2018.

U.S. Appl. No. 15/601,508, filed May 22, 2017, Notice of Allowance dated May 29, 2018.

U.S. Appl. No. 15/670,430, filed Aug. 7, 2017, Notice of Allowance dated Jul. 5, 2018.

PCT Patent Application PCT/US2018/030646 filed on May 2, 2018, International Search Report and Written Opinion dated Jul. 24, 2018.

U.S. Appl. No. 15/601,508, filed May 22, 2017, Non-Final Office Action dated Jan. 25, 2018.

U.S. Appl. No. 15/670,430, filed Aug. 7, 2017, Non-Final Office Action dated Feb. 23, 2018.

U.S. Appl. No. 15/601,533, filed May 22, 2017, Final Office Action dated Feb. 4, 2019.

U.S. Appl. No. 16/156,361, filed Oct. 10, 2018, Non-Final Office Action dated Mar. 21, 2019.

U.S. Appl. No. 16/156,361, filed Oct. 10, 2018, Notice of Allowance dated Jun. 21, 2019.

* cited by examiner

LOCATION-BASED SERVICE ZONE CLUSTER MANAGEMENT AND MONITORING

BACKGROUND

Geographic fences, or "geofences," and beacons can be used for marketing purposes with respect to location-based services. For example, geofences can be used to provide notifications to a mobile device when the mobile devices enters a geographic region defined by the boundaries of a geofence. Likewise, when a mobile device is physically close to a beacon broadcasting a wireless signal, the mobile device can receive the broadcasted signal and a notification may be triggered. The notifications associated with geofences and/or beacons may relate to the location-based services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to various systems and methods for managing location-based service zones (e.g., geofences, beacons, etc.) being monitored by a user device. Some embodiments of the present disclosure relate to receiving a comprehensive set of location-based service zones organized in clusters (e.g., hierarchical, exponential, k-means, etc.) within a dynamically sized geographic region (e.g. active zone) surrounding a user device. For example, when the user device enters the geographic region, the client device may monitor the parameters associated with top-level location-based service zone clusters. When the user device enters a region defining a particular location-based service zone cluster, the user device may begin monitoring the location-based service zones within the particular cluster and may ignore the parameters defining the top-level location-based service zone clusters. When the user device exits the particular location-based service zone cluster, the user device may ignore the location-based service zones within the particular cluster and resume monitoring the parameters defining the top-level location-based service zone clusters.

Examples of location-based service zones include geographic fences ("geofences") and beacons. A geofence can be defined as a virtual geographic boundary, such as the combination of a geographic coordinate and a radius. For example, a geofence may define an area in which a user may experience a location-based service associated with a particular provider. The geofenced area can be formed or defined by a virtual perimeter surrounding the area corresponding to the particular location-based service that a user may want to experience. An interior area of a geofence may be any suitable size and any suitable shape. The virtual perimeter can correspond to a two-dimensional or a three-dimensional perimeter. For example, assume that the provider relates to a delivery service. A two-dimensional perimeter can include an area centered on the delivery location, while a three-dimensional perimeter may include a height or altitude of the delivery location. For example, a three-dimensional perimeter may use height or altitude in order to situate the geofence on a particular floor or suite of a building.

A beacon may comprise a device configured to broadcast a wireless signal. Using the example of the delivery service, a provider device may include a beacon that broadcasts a wireless signal related to the location of the provider device. When a user device is within a proximity of a beacon, the user device can receive the wireless signal, thereby triggering an event notification associated with the beacon (e.g., displaying a message, notifying the provider device of proximate location, etc.).

Providers of services (e.g., mobile store, mobile delivery service, brick-and-mortar store, etc.) may create location-based service zones to initiate user experiences relative to the services. In one non-limiting example, a provider may be associated with a merchant selling items at mobile delivery locations. Each delivery location may be associated with a respective location-based service zone. For example, when the merchant is selling the items at location A, a geofence may be created that defines a boundary surrounding the merchant location. When a user device that is monitoring the geofence crosses the boundary defined by the geofence, the client device may recognize the geofence and perform actions associated with the geofence (e.g., display message including merchant location, send notification to provider to prepare items for pickup, etc.).

An active zone is a dynamically sized geographic area that contains a comprehensive set of location-based service zones. In some embodiments, the active zone can be organized such that the comprehensive set of location-based service zones are placed in various clusters and subsets. For example, different types of client devices may have limitations as to the number of location-based service zones the client device can support. The client device limitations may be imposed by the client device in order to optimize power usage, memory usage, and/or processor usage of the client device. When the number of location-based service zones identified within the geographic region defining the active zone exceeds the limitations of the client devices, the location-based service zones may be organized in various clusters and/or subsets such that the number of location-based service zones within a cluster and/or subset does not exceed the limitations of the client device. A client device can receive the active zone containing the location-based service zones from a server computing device and can monitor the location-service zones included in the active zone.

Figure 1A:
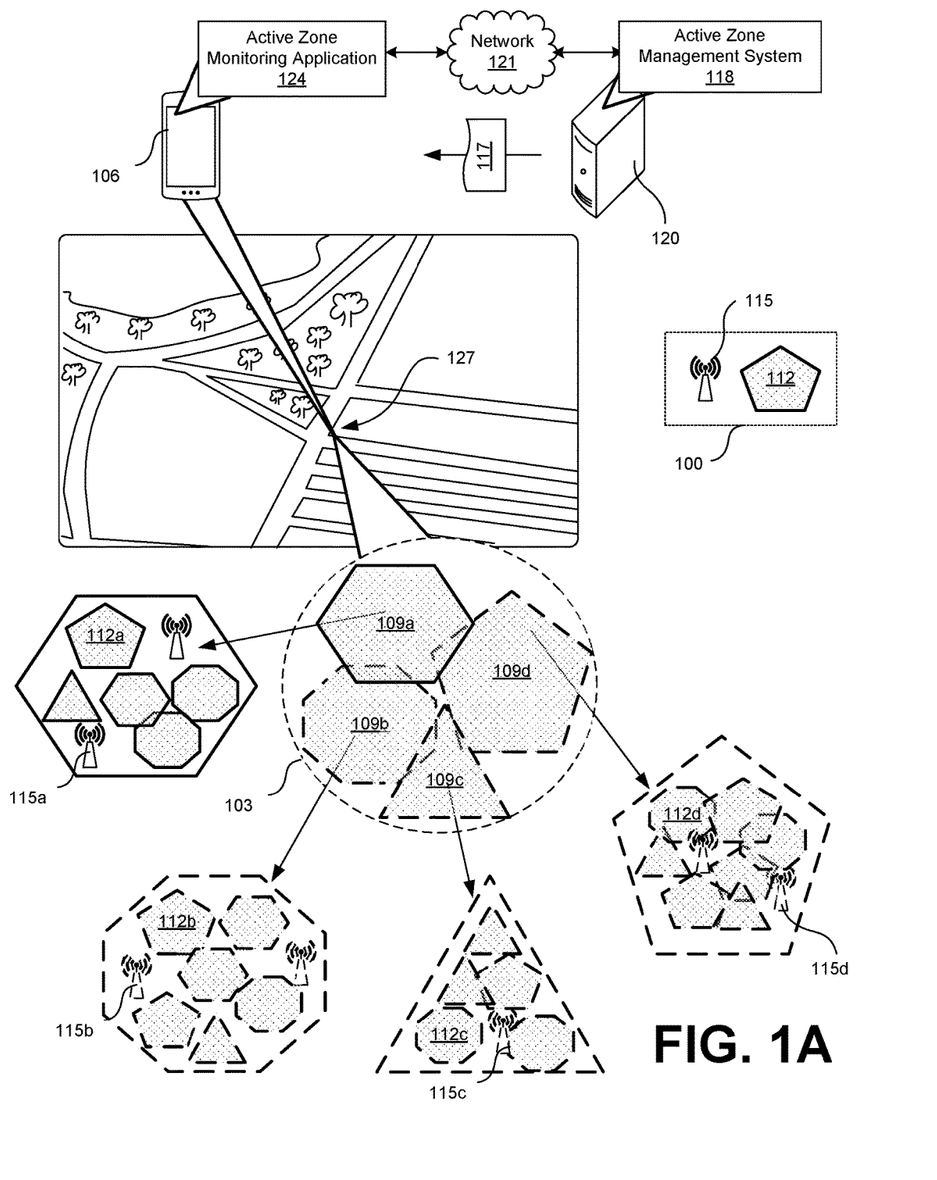
FIGS. 1A and 1B are drawings depicting example scenarios in which a client device monitors location-based service zones within a particular location-based service zone cluster of a provided active zone according to various embodiments of the present disclosure.

Various embodiments of the present disclosure relate to dynamically modifying the location-based service zones being monitored by the client device according to the client device location and the cluster structure of the location-based service zones included within a dynamically sized geographic region. FIG. 1A is a drawing depicting an example scenario showing an active zone 103 being monitored by a client device 106 according to various embodiments of the present disclosure.

In this example, the client device 106 corresponds to a handheld mobile device (e.g., a tablet, a smartphone, etc.). The active zone 103 comprises location-based service zone clusters 109 (e.g., 109a, 109b, 109c, 109d) that each include a subset of location-based service zones 100 that are included within the geographic region defined by the active zone 103. The location-based service zones 100 within the active zone 103 may be organized such that there is a top level of location-based service zone clusters 109 containing a subset of location-based service zones 100. In some embodiments, the subset of location-based service zones 100 can be further reduced into additional subsets of location-based service zones 100 as can be appreciated. The location-based service zones 100 can comprise geofences 112 (e.g., 112a, 112b, 112c, 112d, 112e), beacons 115 (e.g., 115a, 115b, 115c, 115d), and/or any other types of location-based service zones 100 as can be appreciated.

In some embodiments, the active zone 103 may be created by the active zone management system 118 being executed on at least one computing device 120 according to at least a location of the client device 106. An active zone 103 may be created to encompass the client device location according to a predefined radius. For example, in some embodiments, the active zone 103 may be created having a center at the location of the client device 106 and a radius of some predetermined value (e.g., 1 kilometer (km), 5 km, 25 km, etc.). Once the active zone 103 is created, location-based service zones 100 within the active zone 103 may be identified. In some embodiments, the radius has a minimum predefined value (e.g., 1 km, 3 km). This minimum predefined value may be based on device limitations, design choice, precision capabilities for identifying location-based service zones, and/or any other factor as can be appreciated.

In some embodiments, the location-based service zones 100 may be grouped into clusters within the active zone 103. For example, if the number of location-based service zones 100 within the active zone 103 exceed the limitations of the client device with respect to the number of location-based service zones that the client device can monitor, the active zone management system 118 may group the location-based service zones 100 into clusters that include a number of location-based service zones that satisfy the device requirements. FIG. 1A illustrates the active zone 103 comprising location-based service zone clusters 109a, 109b, 109c, 109d that represent a top-level of location-based service zones 100 being monitored by the client device 106.

As shown in FIG. 1A, each location-based service zone cluster 109 includes a subset comprising geofences 112 (e.g., 112a, 112b, 112c, 112d) and beacons 115 (e.g., 115a, 115b, 115c, 115d) that can be monitored by a client device. In the example of FIG. 1A, the client device 106 is located within the geographic parameters of the location-based service zone cluster 109a and is currently monitoring the location-based service zone cluster 109a comprising the geofence 112a and beacon 115a. The particular cluster 109a and location-based service zones 100 being monitored are represented by solid lines, while the clusters 109b, 109c, 109d, and location-based service zones 100 that are being ignored are represented by dashed lines.

The active zone management system 118 may create an active zone 103 and transmit active zone data 117 (e.g., geographic parameters, location-based service zone parameters, cluster data 249 (FIG. 2), etc.) to the active zone monitoring application 124 being executed on the client device 106. The active zone 103 can be created with respect to a client device location 127. The client device location 127 can be determined and/or estimated according to coordinates provided by the client device 106, location-based service zone entry and/or exit history, and/or any other way of determining and/or estimating a device location 127.

In some embodiments, the client device 106 may request an active zone 103 from the computing device 120. In other embodiments, the active zone management system 118 may send an active zone 103 to the client device 106 without a request from the client device 106. For example, the active zone management system 118 may generate and/or send an active zone 103 to the client device 106 periodically. In another example, the active zone management system 118 may send an active zone 103 to the client device 106 upon detection of an exit from a previously monitored active zone 103. The exit from a previously monitored active zone 103 can be determined according to a device location 127 being received from the client device 106, a trigger notification received from the client device 106 indicating that the client device 106 has exited the geographic region defining the active zone 103, and/or any other factor as can be appreciated.

Upon creation of the active zone 103, the active zone management system 118 transmits active zone data 117 to the client device 106. The active zone data 117 includes the data associated with an active zone 103 created for the client device 106 and by the active zone management system 118. The active zone data 117 may include geofence parameters 230, beacon parameters 233, cluster data 249, and/or any other type of data that can be appreciated.

In some embodiments, the location-based service zone clusters 109 may include a quantity of location-based service zones 100 that exceeds a device supported threshold. The device supported threshold may be defined according to client device limitations that may be imposed by the client device 106 in order to optimize power usage, memory usage, and/or processor usage of the client device 106. For example, a particular client device 106 may only be able to monitor fifty (50) location-based service zones 100 at a given time. As such, if the active zone 103 provided by the active zone management system 118 includes a quantity of location-based service zones 100 that exceeds the quantity supported by the client device 106, the number of location-based service zones 100 within the provided active zone 103 may need to be reduced by the client device 106 for monitoring. Factors for reducing the number of location-based service zones 100 for monitoring may include, for example, current location of the client device 106, recently broken location-based service zones 100 by the client device 106, device speed, device direction, user interaction history, aggregate user interaction history, and/or any other factor as can be appreciated.

In some embodiments, the active zone monitoring application 124 may begin monitoring the top-level location-based service zone clusters 109 in response to receiving the active zone 103 from the at least one computing device 120. When the active zone monitoring application 124 detects an entry into a particular location-based service zone cluster 109, the active zone monitoring application 124 may begin monitoring the location-based service zones 100 and/or location-based service zone sub-clusters 109 within the particular location-based service zone cluster 109 while ignoring the other location-based service zone clusters 109.

When the active zone monitoring application 124 detects an exit from the particular location-based service zone cluster 109, the active zone monitoring application 124 may resume monitoring all the location-based service zone clusters 109 while ignoring the location-based service zones 100 within the particular location-based service zone cluster 109. Since the active zone data 117 includes the cluster data 249 for all the location-based service zones 100 and location-based service zone clusters 109 within the active zone 103, the client device 106 can refrain from contacting the computing device 120 upon exiting and entering location-based service zone clusters 109 and/or location-based service zones 100 within the active zone 103.

Figure 1B:
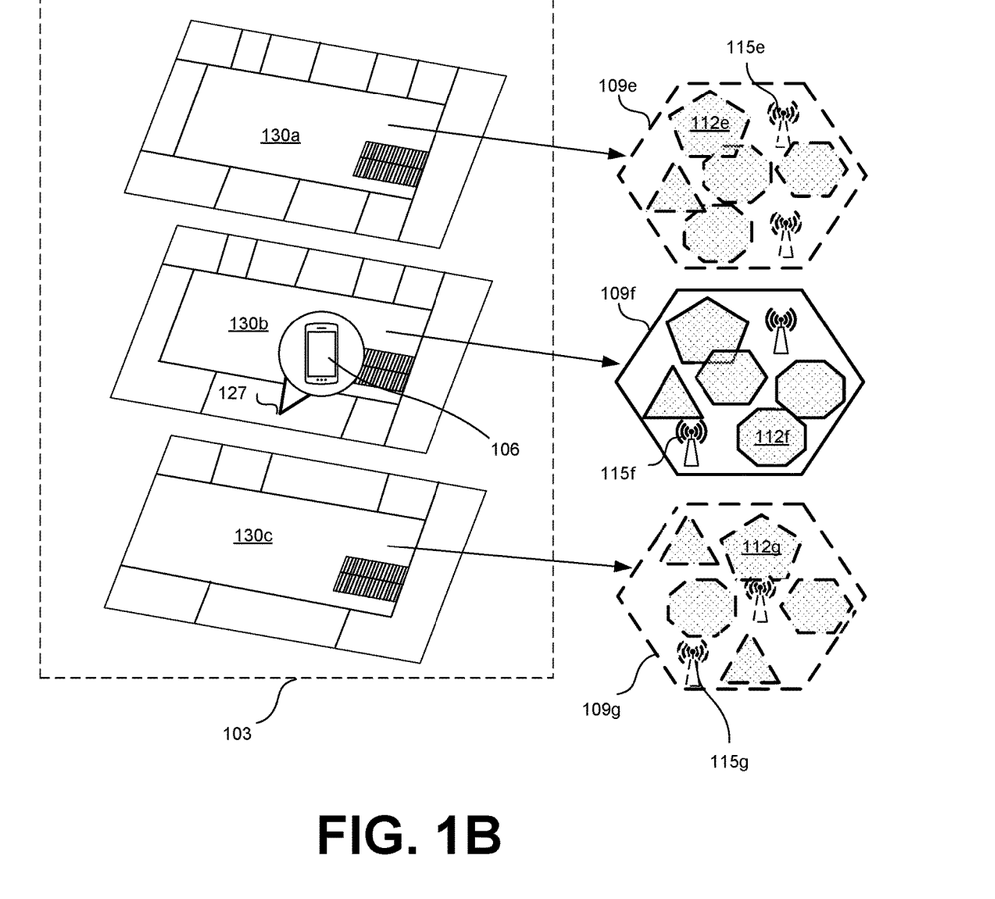

FIG. 1B is a drawing depicting another example scenario showing an active zone 103 being monitored by a client device 106 according to various embodiments of the present disclosure. In this example, the geographic parameters of the active zone 103 may correspond to a structure (e.g., building, shopping mall, market, etc.) and the cluster structure of the location-based service zone clusters 109 and location-based service zones 100 may be predefined. According to various embodiments, the structure may comprise multiple floors, levels, sections, and/or any other type of separation as can be appreciated.

In the present example, the active zone 103 encompass a structure comprising multiple floors 130 (e.g., 130a, 130b, 130c). Each floor 130 may represent a respective location-based service zone cluster 109 (e.g., 109e, 109f, 109g). When the device location 127 of the client device 106 is on a particular floor 130, the active zone monitoring application 124 may monitor the location-based service zones 100 included in the location-based service zone cluster 109 for the particular floor 130. In the example of FIG. 1B, the device location 127 is on the second floor 130b. Accordingly, the active zone monitoring application 124 is monitoring the location-based service zones 100 (e.g., geofence 112f, beacon 115f) within the location-based service zone cluster 109f that corresponds to the second floor 130. The active zone monitoring application 124 is not monitoring the location-based service zone clusters 109e, 109f or the location-based service zones 100 (e.g. geofences 112e, 112g, or beacons 115e, 115g) that are associated with the first and third floors 130.

It should be noted that while the example of FIG. 1B illustrates the location-based service zone clusters 109 being associated with particular floors 130, the location-based service zone clusters 109 may also be associated with particular location within a floor 130. For example, in some embodiments, a first location-based service zone cluster 109 may correspond to a left side of a floor 130 and a second location-based service zone cluster 109 may correspond to a right side of a floor 130.

It should be further noted that while FIG. 1A illustrates an active zone 103 created by the active zone management system 118 and FIG. 1B illustrates an active zone 103 that is predefined, some embodiments may include an active zone 103 that is created by the active zone management system 118 that includes predefined active zones 103. For example, assume that geographic parameters that define an active zone 103 include a shopping mall and its surrounding area. An active zone 103 for the shopping mall may be predefined, as discussed with respect to FIG. 1B.

However, the active zone management system 118 may create the active zone 103 such that the active zone 103 for the shopping mall is one of many location-based service zone clusters 109 within the geographic parameters of the active zone 103. As such, when the client device 106 is outside of the shopping mall, the active zone monitoring application 124 may monitor geographic parameters of the active zone 103 of the shopping mall with the geographic parameters of the other high level location-based service zones clusters 109 within the created active zone 103. When the client device 106 enters the shopping mall, the active zone monitoring application 124 may only monitor the location-based service zone clusters 109 and location-based service zones 100 within the predefined active zone 103 of the shopping mall.

In the following discussion, a general description of the system and its components is provided, followed by a discussion of the operation of the same.

Figure 2:
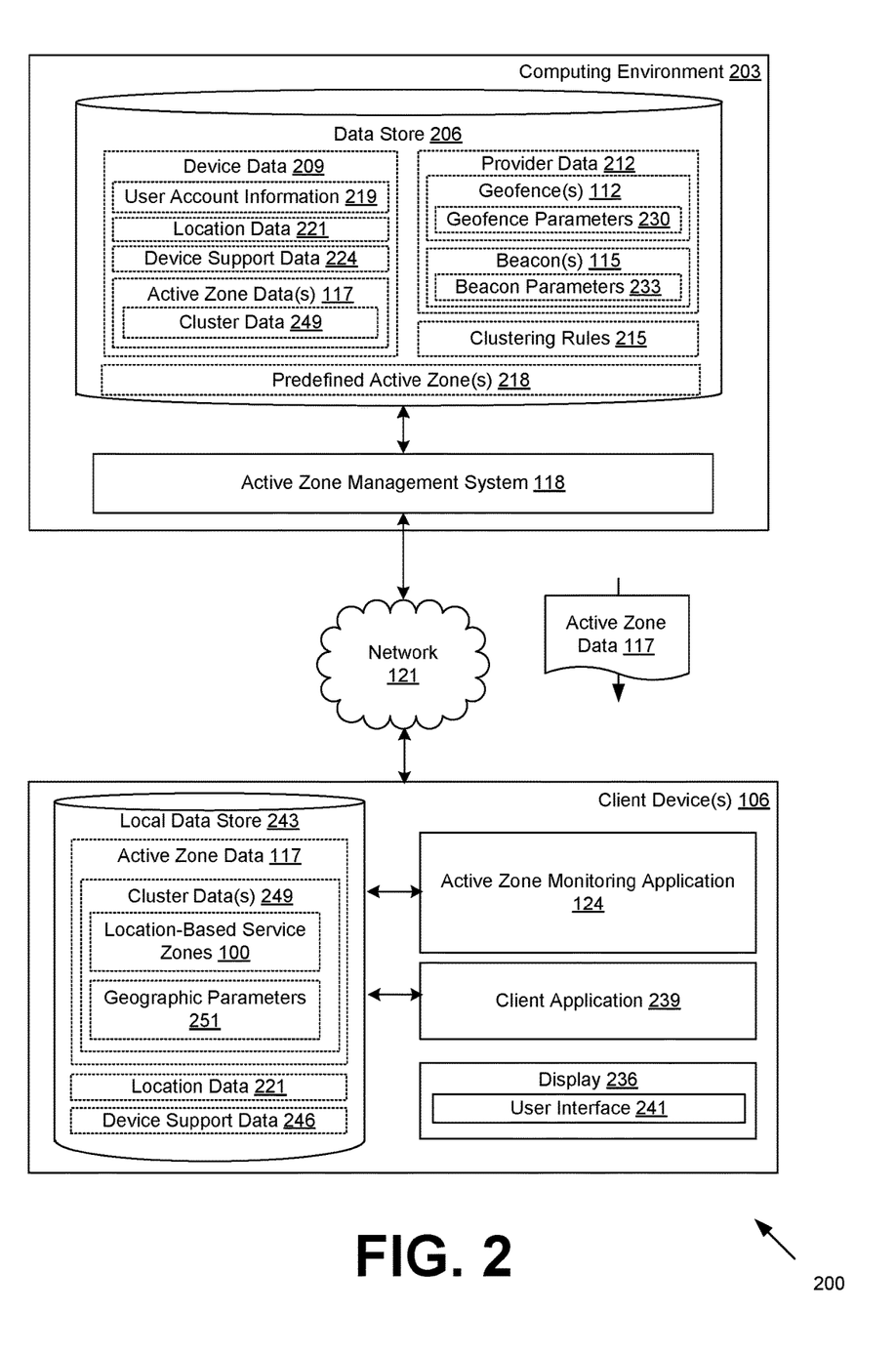
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 106 which are in data communication with each other via a network 121. The network 121 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 206 that is accessible to the computing environment 203. The data store 206 may be representative of a plurality of data stores 206 as can be appreciated. The data stored in the data store 206 for example, is associated with the operation of the various applications and/or functional entities described below.

The components executed on the computing environment 203, for example, include an active zone management system 118, and other applications, services, processes, systems, engines, or functionality not discussed in detail herein. The active zone management system 118 is executed to create active zones 103 for a particular computing device. An active zone 103 is a dynamically sized geographic area that contains a comprehensive set of location-based service zones 100 that are selected with respect to a particular client device 106 and/or user account.

In some embodiments, the active zone management system 118 can create and dynamically size an active zone 103 to include location-based service zones 100 that are specific to a particular client device 106 and/or client device limitations. The active zone management system 118 can identify location-based service zones 100 within the created active zone 103. The active zone management system 118 can create the active zone 103 according to a cluster-type structure that comprises location-based service zone clusters 109 that include subsets of the location-based service zones 100 within the geographic region. In some embodiments, the active zone management system 118 creates location-based service zone clusters 109 according to the device limitations, the proximity of location-based service zones 100 to one another, and/or any other factor as can be appreciated. For example, if the number of location-based service zones 100 identified within the geographic region exceed the device limitations, the location-based service zone clusters 109 may be created to include a subset of location-based service zones 100 that are within the device limitations. The active zone management system 118 may further identify predefined active zones 218 and retrieve the predefined active zones 218 from the data store 206.

The active zone management system 118 can be configured to update and modify the active zone(s) 103 based at least in part on a change in client device location, time restrictions associated with the location-based service zones 100, additions of location-based service zones 100, removal of location-based service zones 100, change in location-based service zone parameters, and/or any other factor as can be appreciated.

The data stored in the data store 206 includes, for example, device data 209, provider data 212, clustering rules 215, predefined active zone(s) 218, and potentially other data. The device data 209 includes data associated with different client devices 106. The device data 209 may include user account information 219, location data 221, device support data 224, active zone data 117, and/or any other data associated with a client device 106.

The user account information 219 may comprise information related to one or more user accounts associated with the client device 106. For example, the user account information 219 may include a username, a first and last name, user interaction history, and/or other type of identifying information. The location data 221 represents a geographic location of the client device 106. The location data 221 may be determined according to geographic coordinates provided to the computing environment 203 from the client device 106. In other embodiments, the location data 221 may be determined according to recently triggered location-based service zones 100 by the client device 106. For example, when a client device 106 enters and/or exits a particular location-based service zone 100, the client device 106 may be configured to send a trigger event notification to the computing environment 203. As such, the location data 221 can be determined according to the geographic parameters of the triggered location-based service zone 100.

The device support data 224 includes a quantity of location-based service zones 100 supported by the client device 106, and/or other features supported by the client device 106. The active zone data 117 may include the active zones 103 for the particular client device 106 that contain the comprehensive set of location-based service zones 100 within the geographic region defined by the parameters of the created active zones 103. The active zone data 117 may include cluster data 249. The cluster data 249 includes the parameters and data associated with the location-based service zone clusters 109 and location-based service zones 100 within each of the location-based service zone clusters 109.

The provider data 212 includes data associated with the providers of the location-based service zones 100. The provider data 212 includes geofence(s) 112, beacon(s) 115, and/or any other data associated with the providers. The geofence 112 represents the virtual geographic boundaries related to the services of the provider. The geofence 112 includes geofence parameters 230 and/or any other type of data associated with the geofence 112. The geofence parameters 230 may include one or more coordinates associated with the geographic location, a radius of the interior area, perimeter specifications for non-circular areas, messages to be presented to the user of a client device 106 when a client device 106 is within the boundary (e.g., "Sale at XYZ Store. Stop in and receive 50% off one item."), an active time, an active date, a unique token identifier, and/or other parameters associated with the geofence 112.

The beacon(s) 115 represent the devices configured to broadcast wireless signals. The beacon(s) 115 include beacon parameters 233 that include the beacon identifier that a client device 106 can use to access the wireless signal broadcasted from the beacon 115 when the client device 106 is within the range to receive the broadcasted signal.

The clustering rules 215 include a set of rules that the active zone management system 118 may use in organizing the active zones 103 into clusters. For example, the clustering rules 215 may comprise one or more clustering algorithms such as, for example, k-means, hierarchical, expectation, distributed-based, density-based, and/or any other type of clustering algorithms as can be appreciated. The clustering rules 215 may include other factors such as, for example, proximity thresholds (e.g., distance between location-based service zones 100), minimum thresholds (e.g., minimum number of location-based service zones 100 within a cluster), maximum thresholds (e.g., maximum number of location-based service zones 100 within a cluster), user account information, user interaction history (e.g., prior interactions with location-based service zones 100) and/or any other factor that may be used to create the location-based service zone clusters 109 and corresponding subsets.

The predefined active zones 218 include geographic parameters, cluster data 249, and location-based service zone parameters that may be predefined. For example, a predefined active zone 218 may be predefined by a human operator according to the various store locations and/or floors 130.

The client device 106 is representative of a plurality of client devices 106 that may be coupled to the network 121. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display 236. The display 236 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as, an active zone monitoring application 124, a client application 239 and/or other applications. The client application 239 may be executed in a client device 106, for example, to access network content served up by the computing environment 203 and/or other servers, thereby rendering a user interface 241 on the display 236. To this end, the client application 239 may comprise, for example, a browser, a dedicated application, etc., and the user interface 241 may comprise a network page, an application screen, etc. The client device 106 may be configured to execute applications beyond the client application 239 such as, for example, email applications, social networking applications, word processors, spreadsheets, and/or other applications.

The active zone monitoring application 124 is executed to monitor location-based service zones 100 for entry and/or exit within a region defined by geographic parameters. The active zone monitoring application 124 can dynamically modify the location-based service zones 100 and/or location-based service zone clusters 109 being monitored at a given time based at least in part on client device location 127. For example, when the client device 106 enters a particular location-based service zone cluster 109, the active zone monitoring application 124 can modify the location-based service zone clusters 109 being monitored by monitoring the location-based service zones 100 within the particular location-based service zone clusters 109 and ignoring the remaining higher-level location-based service zone clusters 109. Likewise, when the client device 106 exits the geographic region of the particular location-based service zone cluster 109, the active zone monitoring application 124 can stop monitoring the location-based service zones 109 within the particular location-based service zone cluster 109 and begin monitoring the higher-level location-based service zone clusters 109 including the particular location-based service zone cluster 109.

In some embodiments, the active zone monitoring application 124 is executed to select a subset of location-based service zones 100 included in a location-based service zone cluster 109 of an active zone 103 received from the active zone management system 118 according to various embodiments of the present disclosure. When the active zone monitoring application 124 receives an active zone 103 containing more location-based service zone clusters 109 or location-based service zones 100 within a location-based service zone cluster 109 than are supported by the client device 106, the active zone monitoring application 124 may select a subset of location-based service zones 100 included in the received active zone 103 according to a variety of factors such as, for example, current location of the client device 106, location-based service zones 100 recently triggered by the client device 106, device speed, device direction, user history, aggregate user history, and/or any other factor as can be appreciated.

The client device 106 may store various data in a local data store 243. The data stored in the local data store 243 may comprise for example, active zone data 117, location data 221, device support data 246, and/or other data. The active zone data 117 includes data defining the active zone 103 and location-based service zones 100 within the active zone 103 that are being monitored by the active zone monitoring application 124. The active zone data 117 includes the cluster data 249 and/or any other data as can be appreciated. The cluster data 249 includes the data for each of the location-based service zones 109 within an active zone 103. The cluster data 249 may comprise the location-based service zones 100 and the geographic parameters 251 defining the location-based service zone clusters 109.

The location-based service zones 100 may comprise the geofence parameters 230 and/or beacon parameters 233 for the location-based service zones 100 that were included in the active zone 103 created by the active zone management system 118. The location-based service zones 100 can further include one or more coordinates associated with the geographic location of the location-based service zones 100, a radius of the interior area, perimeter specifications for non-circular areas, messages to be presented to the user of a client device 106 when a client device 106 is within the boundary (e.g., "Sale at XYZ Store. Stop in and receive 50% off one item."), a beacon identifier that a client device 106 can use to access the wireless signal broadcasted from the beacon 115 when the client device 106 is within the range to receive the broadcasted signal, and/or any other parameter data associated with the location-based service zones 100 within an active zone 103.

The location data 221 corresponds to the location of the client device 106 at a particular instance. For example, the location data 221 may comprise geographic coordinates of the client device 106. In other embodiments, the location data 221 may comprise an estimated location based at least in part on recently triggered and/or broken location-based service zones 103. For example, if the client device 106 exits a particular location-based service zone 100, the location data 221 can be estimated according to the geographic parameters of the particular location-based service zone 100. The device support data 246 includes a quantity of location-based service zones 100 supported by the client device 106, and/or other features supported by the device. The client device limitations may be imposed by the client device 106 in order to optimize power usage, memory usage, and/or processor usage of the client device 106.

Figure 3:
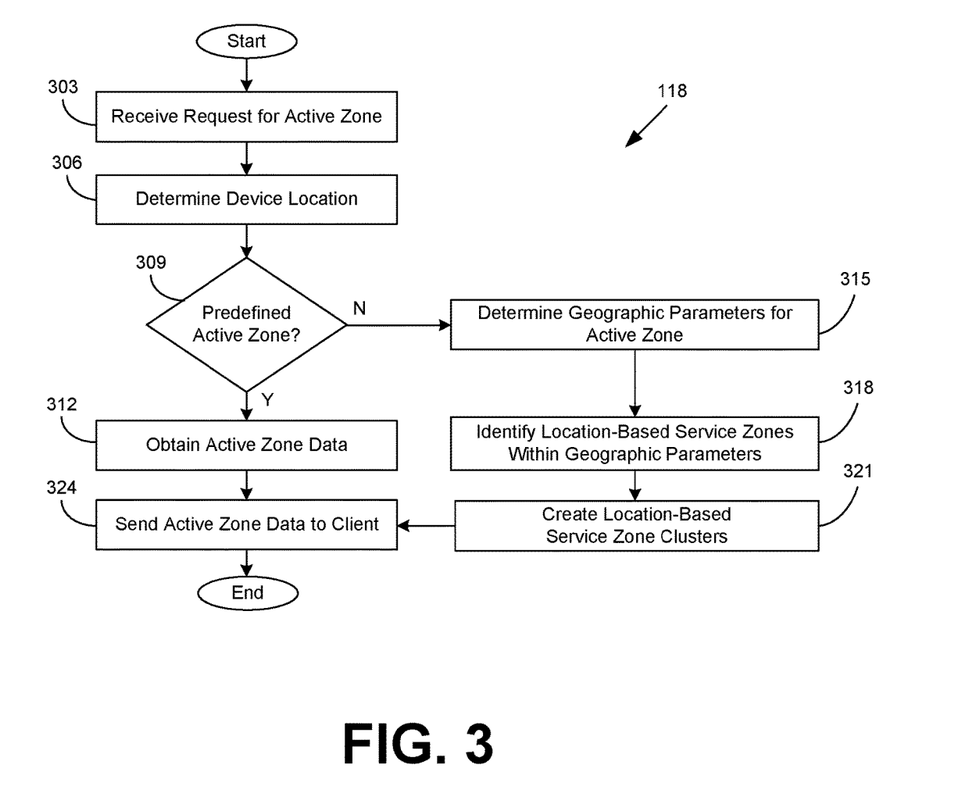
FIG. 3 is a flowchart illustrating one example of functionality implemented as portions of an active zone management system executed in a client device in the networked environment of FIG. 2 according to various embodiments of the present disclosure.

Referring now to FIG. 3, shown is a flowchart that provides one example of the operation of a portion of the active zone management system 118 according to various embodiments. It is understood that the flowchart of FIG. 3 provides merely an example of the many different types of functional arrangements that may be employed to implement the operation of the portion of the active zone management system 118 as described herein. As an alternative, the flowchart of FIG. 3 may be viewed as depicting an example of elements of a method implemented in the computing environment 203 (FIG. 2) according to one or more embodiments.

FIG. 3 provides a non-limiting example of the functionality that may be performed by the active zone management system 118 with respect to creating active zones 103 (FIG. 1) organized in a clustering structure (e.g., hierarchical, exponential, k-means, etc.) according to various embodiments of the present disclosure.

Beginning with box 303, the active zone management system 118 receives a request for an active zone 103 from the client device 106 (FIG. 1). In box 306, the active zone management system 118 determines the device location 127 (FIG. 1). In some embodiments, the request includes location data 221 (FIG. 2), which may be used by the active zone management system 118 to populate the active zone 103 with the location-based service zones 100 (FIG. 1). In other embodiments, the active zone management system 118 may be able to determine a device location 127 (FIG. 1) based in part on trigger notifications received by the active zone management system 118 notifying the active zone management system 118 of the exit or entrance into a particular location-based service zone 100 being monitored by the client device 106. The active zone management system 118 may be able to estimate the device location 127 according to the geographic parameters of the particular location-based service zone 100. The estimated device location 127 may be used by the active zone management system 118 to populate the active zone 103 with the location-based service zones 100.

In box 309, the active zone management system 118 determines whether there is a predefined active zone 218 associated with the device location 127. For example, some types of planned developments (e.g., shopping mall) may have predefined and/or user created active zones 103. If the device location 127 is within the geographic region defining a predefined active zone 218, the active zone management system 118 proceeds to box 312 and obtains the active zone data 117 associated with the predefined active zone 218. In some embodiments, the active zone data 117 is stored in the data store 206. In other embodiments, the active zone data 117 may be retrieved from a data store and/or computing device associated with the user that created the predefined active zone 218. If the device location 127 is not within the geographic region defining a predefined active zone 218, the active zone management system 118 proceeds to box 315.

In box 315, the active zone management system 118 determines the active zone area based in part on the device location 127. According to various embodiments, the active zone area may be determined by using the location of the client device 106 from the location data 236 as a center point and encompassing the center point by a radius of some predetermined value (e.g., 1 kilometer (km), 5 km, 25 km, etc.). Other factors which may be considered in determining the active zone area may comprise the device support data 224, the user account information 219, an amount of location-based service zones 100 within a particular geographic region, user interaction history, aggregate user interaction history, and/or any other factor as can be appreciated.

In box 318, the active zone management system 118 identifies the location-based service zones 100 within the geographic parameters of the active zone 103. For example, the active zone management system 118 may analyze the provider data 212 to identify any geofences 112 and/or beacons 115 that may be included within the geographic region associated with the active zone 103. In some embodiments, a particular location-based service zone 100 may comprise a predefined active zone 218.

In box 321, the active zone management system 118 creates location-based service zone clusters 109. For example, if the number of location-based service zones 100 identified within the geographic parameters of the active zone 103 exceed a device supported threshold and/or any other predefined threshold, the location-based service zones 100 may be grouped into location-based service zone clusters 109 such that a first location-based service zone cluster 109 comprises a first subset of location-based service zones 100 and a second location-based service zone cluster 109 comprises a second subset of location-based service zones 100. In some embodiments, the location-based service zone clusters 109 may overlap such that a particular location-based service zone 100 may be included in multiple location-based service zones 100.

In creating the location-based service zone clusters 109, the active zone management system 118 may apply one or more clustering algorithms defined in the clustering rules 215. In some embodiments, the active zone management system 118 may further create the location-based service zone clusters 109 based at least in part on a proximity between location-based service zones 100, a client-supported threshold, user interaction history, aggregate user interaction history, user account information, and/or any other factor as can be appreciated.

The active zone management system 118 may also define the geographic parameters of the geographic regions for each of the location-based service zone clusters 109. In some embodiments, the active zone management system 118 may create location-based service zone clusters 109 as subsets within location-based service zone clusters 109.

In box 324, the active zone management system 118 sends the active zone data 117 comprising the created active zones 103 and/or predefined active zones 218 to the client device 106. After sending the active zone data 117 to the client device 106, this portion of the active zone management system 118 ends.

Figure 4:
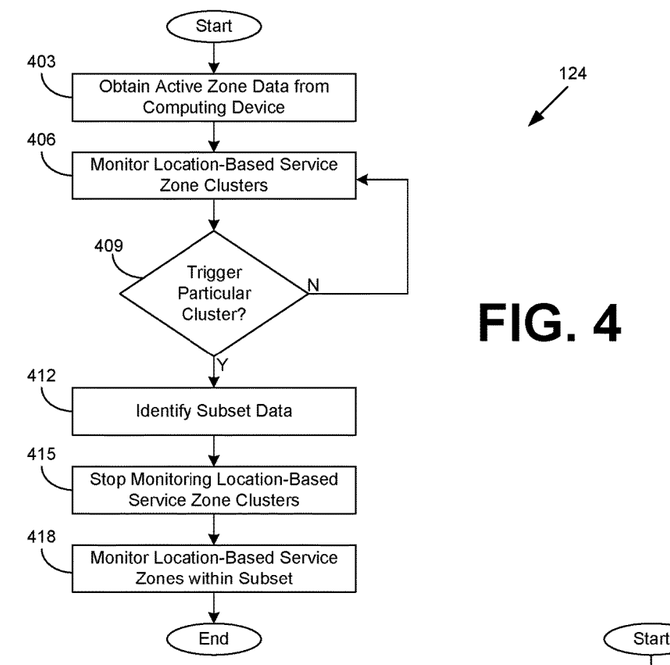
FIG. 4 is a flowchart illustrating one example of functionality implemented as portions of an active zone monitoring application executed in a client device in the networked environment of FIG. 2 according to various embodiments of the present disclosure.

Turning now to FIG. 4, shown is a flowchart that provides one example of the operation of a portion of the active zone monitoring application 124 according to various embodiments. It is understood that the flowchart of FIG. 4 provides merely an example of the many different types of functional arrangements that may be employed to implement the operation of the portion of the active zone monitoring application 124 as described herein. As an alternative, the flowchart of FIG. 4 may be viewed as depicting an example of elements of a method implemented in the computing environment 203 (FIG. 2) according to one or more embodiments.

FIG. 4 provides a non-limiting example of the functionality that may be performed by the active zone monitoring application 124 with respect to monitoring location-based service zone clusters 109 and then location-based service zones 100 within a particular location-based service zone cluster 109 in response to detecting a trigger action associated with the particular location-based service zone cluster 109 according to various embodiments of the present disclosure.

Beginning with box 403, the active zone monitoring application 124 obtains the active zone data 117 from the computing device 120. In some embodiments, the active zone monitoring application 124 obtains the active zone data 117 in response to a request for an active zone 103. In other embodiments, the active zone management system 118 being executed on the computing device 120 may send the active zone data 117 without a request. In box 406, the active zone monitoring application 124 begins monitoring the top-level location-based service zone clusters 109 defined by the active zone 103. For example, the cluster data 249 may include geographic parameters defining the geographic regions for each of the location-based service zone clusters 109. The active zone monitoring application 124 may monitor the device location 127 with respect to the geographic parameters of each location-based service zone 109.

In box 409, the active zone monitoring application 124 may determine whether there has been a trigger action associated with a particular location-based service zone cluster 109 being monitored. For example, a trigger action may comprise the client device 106 entering into the geographic region of a particular location-based service zone cluster 109. If the active zone monitoring application 124 detects a trigger action, the active zone monitoring application 124 proceeds to box 412. Otherwise, the active zone monitoring application 124 returns to box 406 and continues to monitor the location-based service zone clusters 109 and wait for a trigger action.

In box 412, the active zone monitoring application 124 identifies the subset data associated with the particular location-based service zone cluster 109. Specifically, the active zone monitoring application 124 identifies the location-based service zones 100 and/or location-based service zone clusters 109 that are included within the geographic parameters of the particular location-based service zone clusters 109. In box 415, the active zone monitoring application 124 stops monitoring the location-based service zone clusters 109, and in box 418, the active zone monitoring application 124 begins monitoring the location-based service zones 100 and/or location-based service zone clusters 109 within the particular location-based service zone cluster 109. After the active zone monitoring application 124 begins monitoring the location-based service zones 100 within the location-based service zone cluster 109, this portion of the active zone monitoring application 124 ends.

Figure 5:
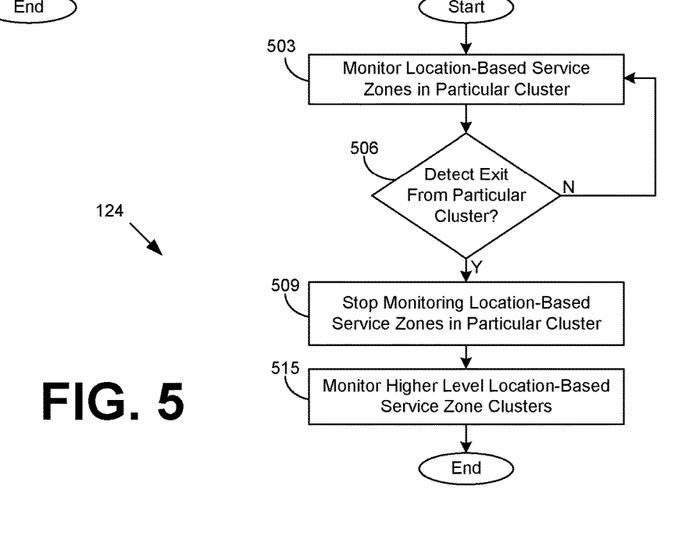
FIG. 5 is a flowchart illustrating one example of functionality implemented as portions of an active zone monitoring application executed in a client device in the networked environment of FIG. 2 according to various embodiments of the present disclosure.

Referring next to FIG. 5, shown is a flowchart that provides one example of the operation of a portion of the active zone monitoring application 124 according to various embodiments. It is understood that the flowchart of FIG. 5 provides merely an example of the many different types of functional arrangements that may be employed to implement the operation of the portion of the active zone monitoring application 124 as described herein. As an alternative, the flowchart of FIG. 5 may be viewed as depicting an example of elements of a method implemented in the client device 106 (FIG. 1) according to one or more embodiments.

FIG. 5 provides a non-limiting example of the functionality that may be performed by the active zone monitoring application 124 with respect to monitoring a higher level of location-based service zone clusters 109 in response to detecting an exit from a particular location-based service zone cluster 109 in accordance to various embodiments of the present disclosure.

Beginning with box 503, the active zone monitoring application 124 begins monitoring location-based service zones 100 within a particular location-based service zone cluster 109. For example, the client device 106 may be entered into the region defining the particular location-based service zone cluster 109. In box 506, the active zone monitoring application 124 determines whether an exit from the region defining the particular location-based service zone cluster 109 has been detected. The active zone monitoring application 124 may detect an exit by determining that the device location 127 has moved outside the geographic parameters defining the particular location-based service zone cluster 109. If the active zone monitoring application 124 detects an exit, the active zone monitoring application 124 proceeds to box 509. Otherwise, the active zone monitoring application 124 returns to box 503 and continues to monitor the location-based service zones 100 within the location-based service zone cluster 109.

In box 509, the active zone monitoring application 124 stops monitoring the location-based service zones 100 and/or location-based service zone clusters 109 within the geographic region of the particular location-based service zone cluster 109. In box 512, the active zone monitoring application 124 expands the active zone 103 to begin monitoring the higher level location-based service zone clusters 109 and/or location-based service zones 100 that are at the same level as the particular location-based service zone cluster 109. Once the active zone monitoring application 124 is monitoring the higher level location-based service zone clusters 109 and/or location-based service zones 100, this portion of the active zone monitoring application 124 ends.

Figure 6:
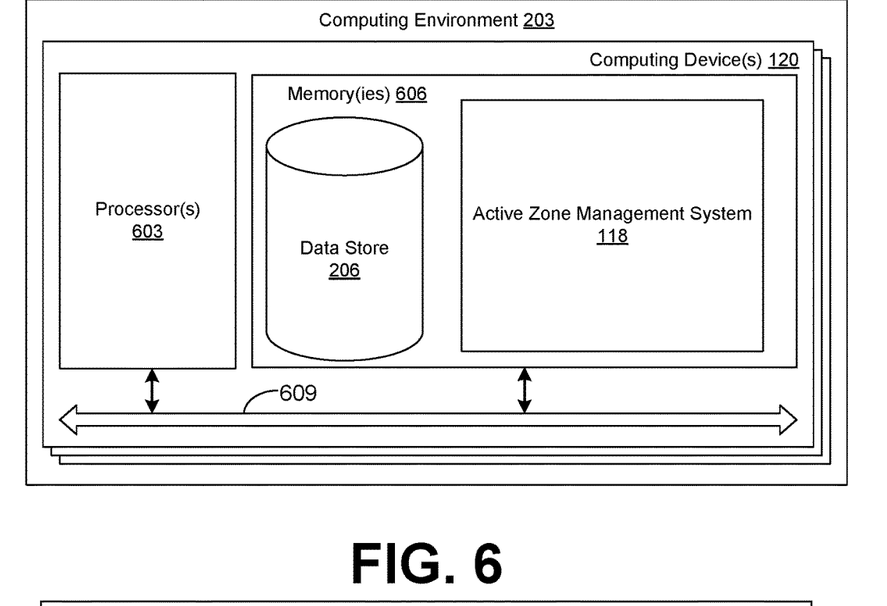
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 120. Each computing device 120 includes at least one processor circuit, for example, having a processor 603 and a memory 606, both of which are coupled to a local interface 609. To this end, each computing device 120 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the active zone management system 118, and potentially other applications. Also stored in the memory 606 may be a data store 206 and other data. In addition, an operating system may be stored in the memory 606 and executable by the processor 603.

Figure 7:
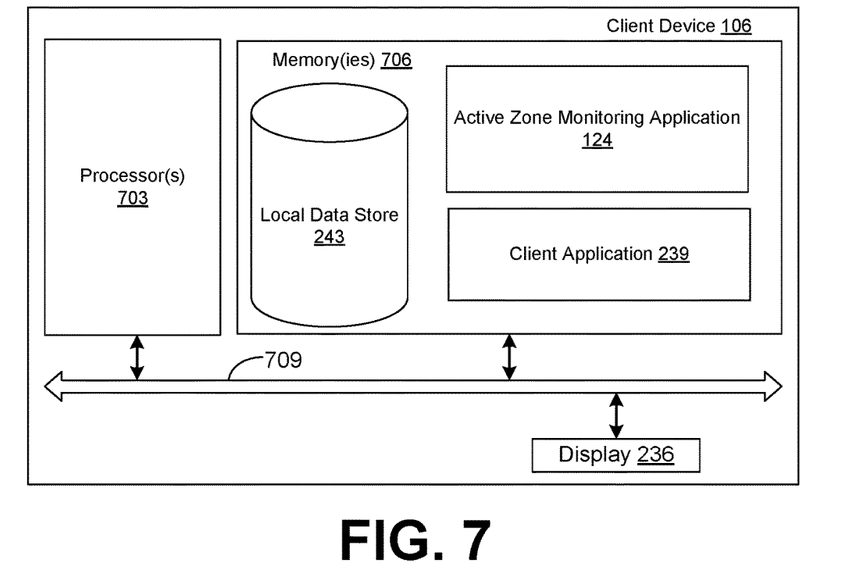
FIG. 7 is a schematic block diagram that provides one example illustration of a client device employed in the networked environment of FIG. 2 according to various embodiments of the present disclosure.

With reference to FIG. 7, shown is a schematic block diagram of the client device 106 according to an embodiment of the present disclosure. The client device 106 includes at least one processor circuit, for example, having a processor 703, a memory 706, and a display 236, all of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the active zone monitoring application 124, the client application 239, and potentially other applications. Also stored in the memory 706 may be a local data store 243 and other data. In addition, an operating system may be stored in the memory 706 and executable by the processor 703.

Referring next to both FIGS. 6 and 7, it is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the active zone management system 118, the active zone monitoring application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the active zone management system 118 and the active zone monitoring application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the active zone management system 118 and the active zone monitoring application 124 that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the active zone management system 118 and the active zone monitoring application 124 may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 120, or in multiple computing devices 120 in the same computing environment 203, or in the same client device 106.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, wherein, when executed, the program causes the first computing device to at least:
   obtain active zone data from a second computing device in response to sending a request for an active zone to the second computing device, the active zone data comprising a plurality of location-based service zones organized in a plurality of location-based service zone clusters based at least in part on a proximity threshold between individual location-based service zones and geographic parameters defining a geographic region of the active zone;
   select a reduced subset of the plurality of location-based service zones for monitoring within the active zone based at least in part on at least one of a device speed or a device direction;
   initiate monitoring of the plurality of location-based service zone clusters, the plurality of location-based service zone clusters comprising individual ones of the reduced subset of the plurality of location-based service zones;
   detect an entry into a particular location-based service zone cluster of the plurality of location-based service zone clusters;
   terminate monitoring of the plurality of location-based service zone clusters; and
   initiate monitoring of a portion of location-based service zones within the particular location-based service zone cluster.

2. The non-transitory computer-readable medium of claim 1, wherein, when executed, the program causes the first computing device to at least:
   detect an exit from the particular location-based service zone cluster;
   terminate monitoring of the portion of the plurality of location-based service zones; and
   initiate monitoring of the plurality of location-based service zone clusters.

3. The non-transitory computer-readable medium of claim 1, wherein a number of location-based service zones within the active zone exceeds a client-supported threshold.

4. A system, comprising:
   a first computing device; and
   at least one application executed in the first computing device, wherein, when executed, the at least one application causes the first computing device to at least:
      receive active zone data from a second computing device, the active zone data defining a plurality of location-based service zones within a geographic region;
      select a reduced subset of the plurality of location-based service zones for monitoring within an active zone based at least in part on at least one of a device speed or a device direction, the reduce subset of the plurality of location-based service zones being grouped into individual clusters of a plurality of clusters;
      monitor one or more cluster regions defined by geographic parameters of the individual clusters;
      detect an entry into a particular cluster of the plurality of clusters; and
      monitor a subset of location-based service zones within the particular cluster, a remaining clusters of the plurality of clusters being ignored.

5. The system of claim 4, wherein the individual clusters comprise a subset of clusters.

6. The system of claim 5, wherein the active zone data further comprises the geographic parameters defining the geographic region.

7. The system of claim 6, wherein, when executed, the at least one application further causes the first computing device to at least detect an exit from the particular cluster.

8. The system of claim 4, wherein, when executed, the at least one application further causes the first computing device to at least:
   stop monitoring the subset of location-based service zones within the particular cluster; and
   resume monitoring of the one or more cluster regions defined by the geographic parameters of the individual clusters.

9. The system of claim 4, wherein a number of the plurality of location-based service zones within the active zone defined by the active zone data exceeds a client-supported threshold.

10. The system of claim 4, wherein the geographic region defines a building structure having a plurality of floors, and wherein the individual clusters correspond to a respective floor of the plurality of floors within the building structure.

11. The system of claim 4, wherein individual location-based service zones of the plurality of location-based service zones comprise at least one of a geofence or a beacon.

12. The system of claim 4, wherein, when executed, the at least one application further causes the first computing device to at least:
   determine that a number of location-based service zones within the particular cluster meets or exceeds a client-supported threshold.

13. The system of claim 4, wherein selecting the reduced subset of the plurality of location-based service zones for monitoring within the active zone is further based at least in part on at least one prior interaction of the first computing device with one of the plurality of location-based service zones.

14. A method, comprising:
   receiving, via at least one computing device, a request for an active zone from a client device, the active zone including a plurality of location-based service zones within a geographic region;
   generating, via the at least one computing device, a plurality location-based service zone clusters comprising individual ones of the plurality of location-based service zones based at least in part on a proximity threshold between individual location-based service zones;

defining, via the at least one computing device, one or more geographic parameters of the geographic region of the active zone according to a location of the client device;

encoding, via the at least one computing device, active zone data defining the active zone, the active zone data comprising geographic parameters of the active zone, individual location-based service zone clusters of the location-based service zone clusters comprising a respective subset of the plurality of location-based service zones, and at least one location-based service zone cluster comprising at least one location-based service zone and a secondary location-based service zone cluster; and sending, via the at least one computing device, the active zone data to the client device, the client device being configured to select a reduced subset of the plurality of location-based service zones for monitoring within the active zone based at least in part on at least one of a device speed or a device direction.

15. The method of claim 14, further comprising determining, via the at least one computing device, the location of the client device based at least in part on at least one of an entrance into or an exit out of a location-based service zone being monitored by the client device.

16. The method of claim 15, wherein the request comprises location data associated with a broken location-based service zone.

17. The method of claim 14, further comprising obtaining, via the at least one computing device, cluster data from a data store, the cluster data defining a hierarchy of predefined location-based service zone clusters.

18. The method of claim 14, further comprising determining, via the at least one computing device, that a number of the plurality of location-based service zones within the geographic parameters of the active zone meet or exceed a client-supported threshold.

19. The method of claim 18, further comprising grouping, via the at least one computing device, the plurality of location-based service zones within the geographic parameters of the active zone into the plurality of location-based service zone clusters.

20. The method of claim 19, wherein grouping the plurality of location-based service zones comprises applying a clustering algorithm.

* * * * *